(12) United States Patent
Kramer et al.

(10) Patent No.: US 8,862,547 B2
(45) Date of Patent: Oct. 14, 2014

(54) CENTRALIZING DATA BACKUP RECORDS FROM MULTIPLE SERVERS ONTO A CENTRAL SERVER

(75) Inventors: Eric Scott Kramer, Brighton, MA (US); Michael David Kramer, Sharon, MA (US); Leonard Joseph DiCarlo, Wayland, MA (US)

(73) Assignee: ELM Technologies, Inc., Needham, MA (US)

(*) Notice: Subject to any disclaimer, the term of this patent is extended or adjusted under 35 U.S.C. 154(b) by 1523 days.

(21) Appl. No.: 12/134,010

(22) Filed: Jun. 5, 2008

(65) Prior Publication Data

US 2009/0307236 A1  Dec. 10, 2009

(51) Int. Cl.
*G06F 7/00* (2006.01)
*G06F 17/00* (2006.01)
*G06F 11/14* (2006.01)
*G06F 17/30* (2006.01)

(52) U.S. Cl.
CPC ........ *G06F 11/1448* (2013.01); *G06F 11/1464* (2013.01)
USPC .......................................... 707/640; 707/654

(58) Field of Classification Search
CPC ............ G06F 11/1458; G06F 11/1448; G06F 11/1464
USPC ............ 707/659, 999.001–999.005, 640, 654
See application file for complete search history.

(56) References Cited

U.S. PATENT DOCUMENTS

| | | | |
|---|---|---|---|
| 6,539,422 B1 * | 3/2003 | Hunt et al. | 709/217 |
| 6,640,217 B1 * | 10/2003 | Scanlan et al. | 1/1 |
| 6,640,278 B1 * | 10/2003 | Nolan et al. | 711/6 |
| 6,785,786 B1 * | 8/2004 | Gold et al. | 711/162 |
| 7,752,169 B2 * | 7/2010 | Rhodes | 707/640 |
| 2001/0037474 A1 * | 11/2001 | Steegmans | 714/13 |
| 2002/0078728 A1 * | 6/2002 | Mukaigawa et al. | 72/239 |
| 2002/0107877 A1 * | 8/2002 | Whiting et al. | 707/204 |
| 2002/0169740 A1 * | 11/2002 | Korn | 707/1 |
| 2003/0154199 A1 * | 8/2003 | Thomas et al. | 707/10 |
| 2003/0158831 A1 * | 8/2003 | Zaremba | 707/1 |
| 2003/0225733 A1 * | 12/2003 | Rhodes | 707/1 |
| 2004/0260973 A1 * | 12/2004 | Michelman | 714/13 |
| 2006/0129746 A1 * | 6/2006 | Porter | 711/100 |
| 2006/0156052 A1 * | 7/2006 | Bodnar et al. | 714/2 |
| 2007/0073791 A1 * | 3/2007 | Bruce et al. | 707/204 |
| 2007/0100913 A1 * | 5/2007 | Sumner et al. | 707/204 |
| 2007/0168478 A1 * | 7/2007 | Crosbie | 709/221 |
| 2010/0077160 A1 * | 3/2010 | Liu et al. | 711/162 |
| 2010/0107158 A1 * | 4/2010 | Chen et al. | 718/1 |

* cited by examiner

*Primary Examiner* — Kannan Shanmugasundaram
(74) *Attorney, Agent, or Firm* — BainwoodHuang

(57) ABSTRACT

A method of managing backup records is provided. A central server receives, across a network, the contents of a first backup catalog from a first backup server as well as the contents of a second (distinct) backup catalog from a second backup server. The central server also extracts backup records from the first backup catalog and the second backup catalog and places the contents of each extracted backup record into a central backup catalog on the central server. Software for carrying out the method is also provided.

17 Claims, 4 Drawing Sheets

CENTRALIZING DATA BACKUP RECORDS FROM MULTIPLE SERVERS ONTO A CENTRAL SERVER

BACKGROUND

Backup servers are computer systems that back up data from a set of client computers and manage the associated backup records. Backup servers typically run backup server software, such as, for example, Veritas® NetBackup™ distributed by the Symantec Corporation of Cupertino, Calif., or CA ARCserve® Backup distributed by CA, Inc. of Long Island, N.Y. Such software keeps a record of every backup operation, storing, for example, the client computer from which the data came, the files included in the backup, a serial number of a tape (or other medium) on which the backed-up data is stored, and an expiration date for the backed-up data.

In some instances, an organization may operate multiple backup servers. Typically, a company having operations at several sites around the world will run a separate backup server for each site. Alternatively, a company having multiple departments will run a separate backup server for each department.

SUMMARY

Unfortunately, the above-described conventional approaches suffer from deficiencies. According to the standard approach, if a backup server is old and is ready to be taken out of service in favor of a newer application, the backup server must be maintained as long as it contains unexpired backup records. This is wasteful, because it requires outdated equipment to be maintained. Thus, the organization typically must continue employing (and in some cases training) skilled technicians trained to support and operate these outdated systems.

Furthermore, if a user wishes to search the backups for a particular file or set of files, he or she must perform a separate search on each backup server through which the data may have been originally backed up. In a large organization having a large number of backup servers, this may require the user to perform many separate searches, wasting much time and effort. If the organization runs several different types of backup server software on its various backup servers, it makes the task all the more difficult.

In contrast, embodiments of the invention overcome these deficiencies. In one embodiment, a method of managing backup records is provided. In such an embodiment a central server receives, across a network, the contents of a first backup catalog from a first backup server as well as the contents of a second (distinct) backup catalog from a second backup server. The central server also extracts backup records from the first backup catalog and the second backup catalog and places the contents of each extracted backup record into a central backup catalog on the central server.

Thus, all the backup records from several backup servers (which may be running different and possibly incompatible backup server software) are centralized onto a central backup catalog on a central server. This allows old backup catalogs to be retired after the backup records are placed on the central server. It also allows a user to search all backup records located on the central server in a single operation without the need to perform a separate search on many different machines. Software for carrying out the method is also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
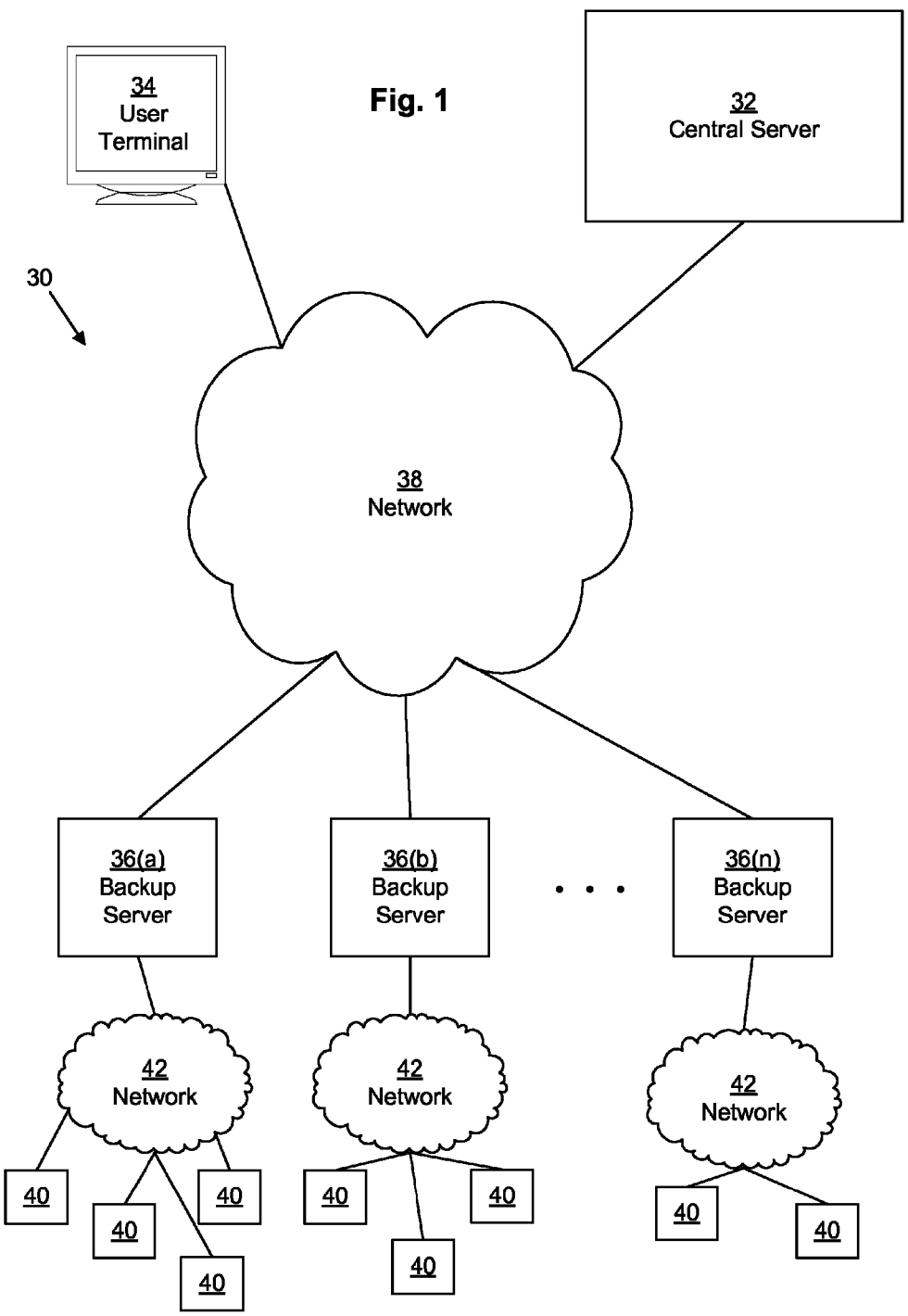
FIG. 1 illustrates a system for use in practicing various embodiments.

FIG. 1 depicts a system 30 for use in practicing various embodiments. System 30 includes a central server 32, a user terminal 34, and various backup servers 36(a), 36(b), . . . 36(n) (generally backup servers 36), each of which connect to network 38. Each backup server connects to various clients 40. In some embodiments, each client 40 may connect to its associated backup server 36 over network 38, while in other embodiments, each client 40 may connect to its associated backup server 36 over a separate network 42. In some embodiments, user terminal 34 may connect to central server 32 over network 38, while in other embodiments, user terminal 34 may connect to central server 32 directly or over a separate network.

Figure 2:
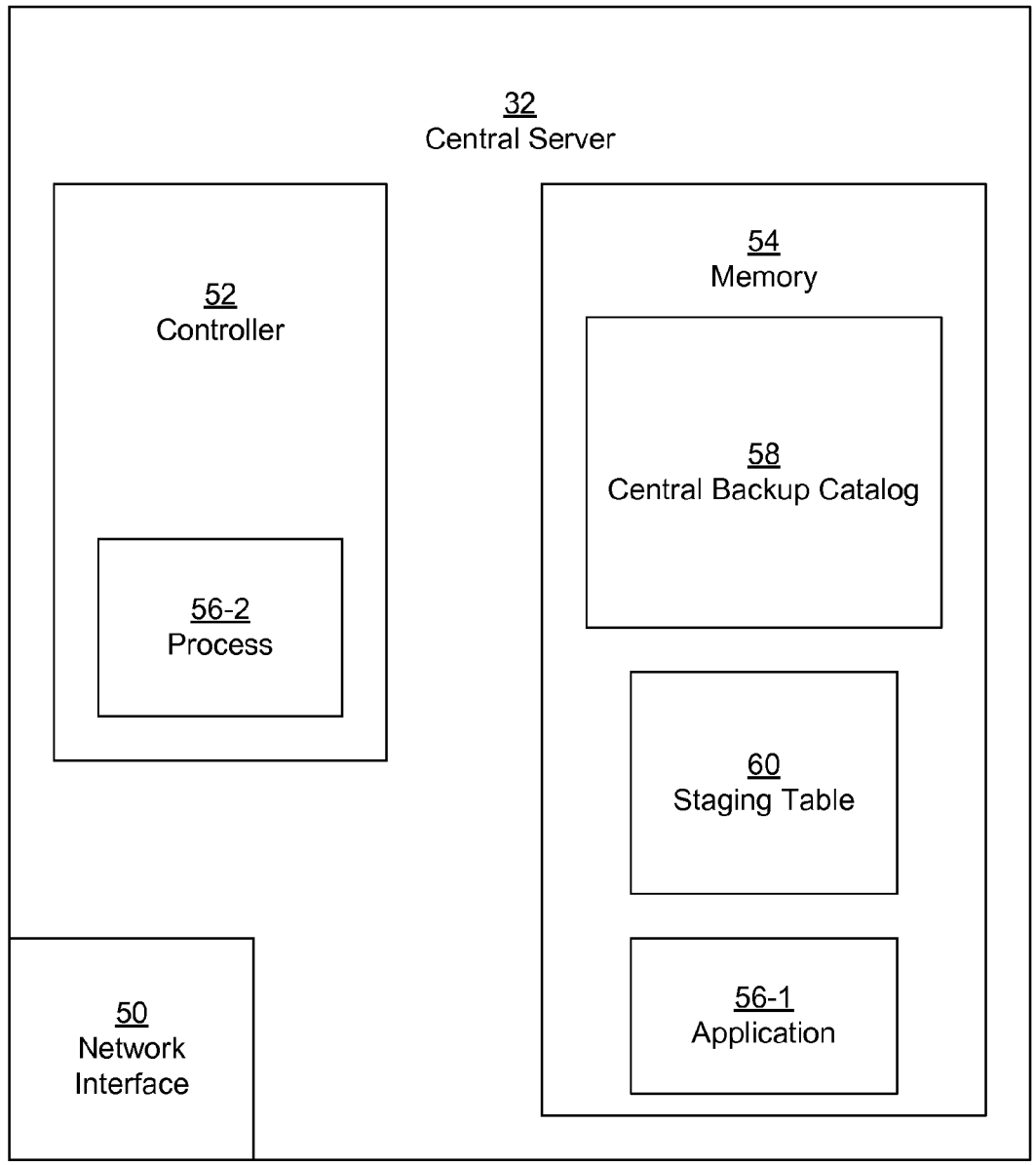
FIG. 2 illustrates an apparatus for use in practicing various embodiments.

FIG. 2 depicts the central server 32 of one embodiment in more detail. Central server 32 includes a network interface 50 for connecting to network 38 as well as a controller 52 and memory 54. Memory 54 stores an application 56-1, which when run, causes controller 52 to execute process 56-2. Memory 54 also stores central backup catalog 58 and staging table 60. Central server 32 may, in some embodiments, also have input/output devices such as a keyboard, mouse, and display monitor.

Figure 3:
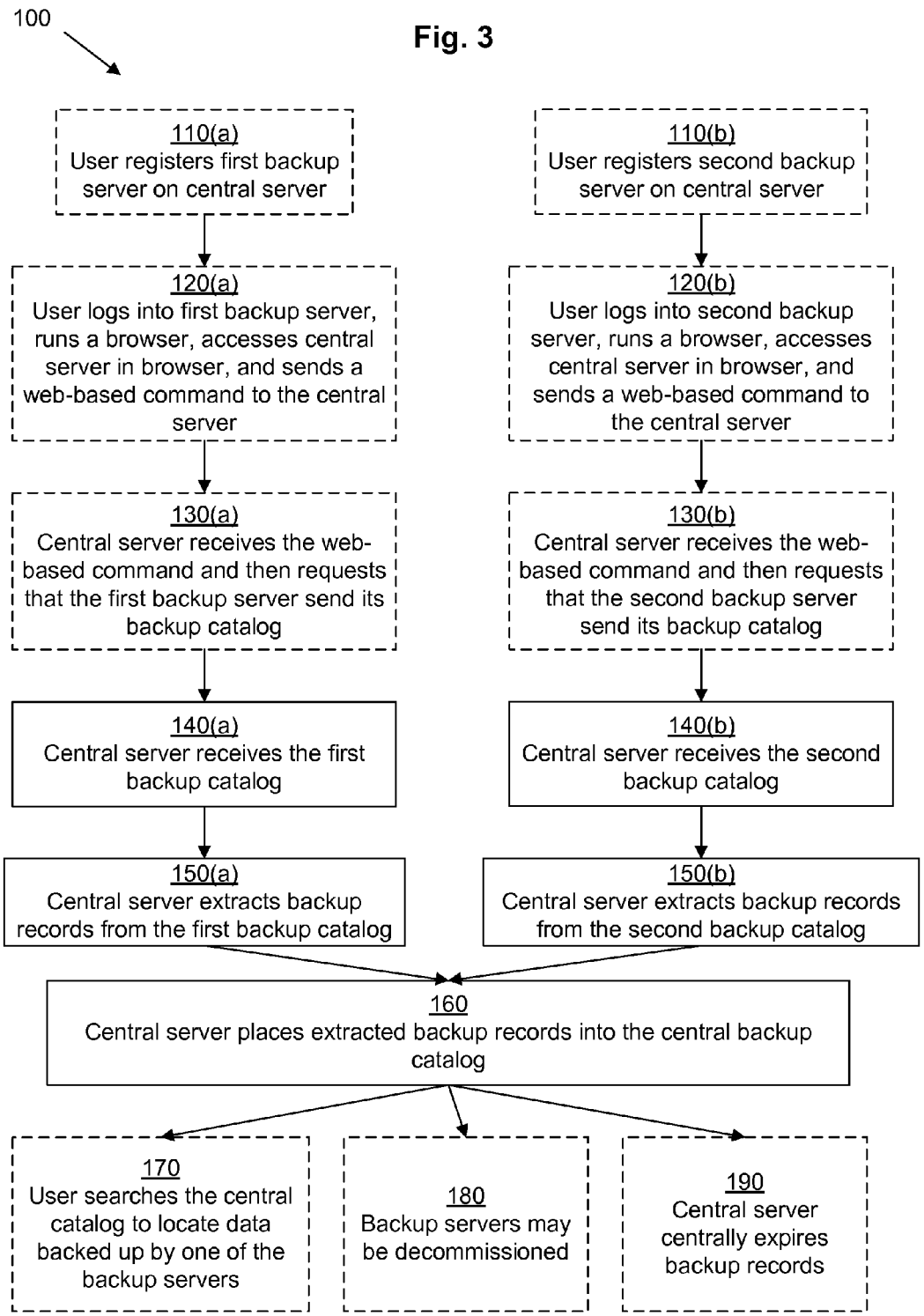
FIG. 3 illustrates the method of various embodiments.

FIG. 3 depicts the method 100 of one embodiment. Method 100 may be embodied in process 56-2 (for example, in software). In optional step 110(a), a user registers first backup server 36(a) with central server 32. This entails specifying a machine name and operating system of the machine for first backup server 36(a). It may also include specifying what kind of backup software first backup server 36(a) runs.

In optional step 120(a), the user logs into first backup server 36(a) and loads a web browser (if not already loaded), and then navigates the browser to a configuration page located at the central server 32. At that configuration page, the user will typically click on a link or button, indicating that the first server 36(a) is ready to upload its backup catalog. Such a click causes a web-based command to be sent to the central server 32. The software verifies that the machine is the correct machine for a pull. If the verification is true, the software allows the server to be pulled by enabling a button.

In some embodiments, if the first backup server 36(a) is not capable of running a web browser (having the appropriate level of Java support), then the drive or folder storing the backup catalog of the first backup server 36(a) may be mounted on a remote machine which is capable of running a web browser. For example, in a Windows environment, this may be done with File and Print Sharing, or in a Unix environment, this may be done with a symbolic link. The user, in such cases, would log into the remote machine and run a web browser on the remote machine.

In optional step 130(a), the central server 32 receives the web-based command from the first backup server 36(a) (due, for example, to the button click), and in response, the central server sends a web-based request to the first backup server 36(a), requesting that the first backup server 36(a) send the contents of its backup catalog to the central server 32. In some embodiments, central server 32 sends a web-browser-compatible applet (such as, for example, a Java-based applet using Ajax) to the first backup server 36(a). This web-browser-compatible applet, upon being loaded on the first backup server 36(a), causes the first backup server 36(a) to transfer the contents of its backup catalog across network 38 towards central server 32. In some embodiments, the user can pause and restart this at their leisure. Additional detail about one embodiment is provided below.

The web browser launches the Java applet, and the web page tells the applet to start reading data from the backup system. The applet starts reading data, which it places into a memory queue of custom data structures. At the same time, the page starts polling the applet, constantly asking for data from the queue. In response to a polling call from the page, the applet dequeues data (when there is, in fact, data in the queue) and returns it to the page in the form of a JSON string. The page sends the JSON string containing the data to the central server 32 using an Ajax request. When the Ajax request completes, the page goes back to polling the applet for more data from the queue. The polling/dequeuing is repeated until the applet signals that there is no more data to send (i.e., it has processed all of the information from the backup system).

In step 140(a), central server 32 receives the first backup catalog from first backup server 36(a), placing the received catalog in staging table 60.

In step 150(a), central server 32 extracts backup records from the first backup catalog. In some embodiments, a "scrubber" application, running on the central server 32, extracts the backup records from the first backup catalog.

Steps 110(b)-160(b) mirror steps 110(a)-160(a), except that they are performed in connection with second backup server 36(b) rather than first backup server 36(a). It should be understood that similar steps may also be performed in connection with other backup servers 36 as well, so that all the backup catalogs from all the backup servers 36 in an organization are transferred to the central server 32, their respective backup records being extracted from staging table 60 (and ultimately transferred to central backup catalog 58 as described below).

In step 160, central server 32 places the extracted backup records into central backup catalog 58. In some embodiments, once the "scrubber" application has completed extracting all the backup records from the first backup server 36(a), the contents of the staging table 60 are placed into the central backup catalog 58 (and the staging table is emptied). Similarly, once the "scrubber" application has completed extracting all of the backup records from the second backup server 36(b) (and each subsequent backup server 36), the contents of the staging table 60 are placed into the central backup catalog 58 as well. This is because, in some embodiments, the central backup catalog 58 is being searched upon while information is being loaded into the staging table 60. Adding the records to the central backup catalog 58 while searching may create latency on the search, because the records, in some embodiments, may need to be de-duplicated and sorted (indexed) as they are entered. Thus, records are not continuously added directly into the central backup catalog 58 as they are extracted, because that would result in the central backup catalog 58 creating slow result sets upon searches. Rather, the central backup catalog 58 need only be "scrubbed" for each backup catalog that is uploaded.

The central backup catalog 58 stores backup records. Backup records typically contain the following data elements: a backup job name, a tape serial number, a backup date, en expiration date, the number of files backed up in the job, the name of the client 42 from which the files came, the name of the backup server 36 that the record came from, and the type and version number of backup catalog software that the record was originally recorded with. The backup record also typically stores a list of all the files backed up in the associated backup job (with full path information).

In optional step 170, the user searches the central backup catalog 58 for backup records that were taken from the various backup servers 36. Thus, the user is able to locate files that were originally backed up by any of the backup servers 36. In addition, the user need not be aware of which backup server 36 any of the records being searched for was originally backed up on. This can be particularly useful when producing electronic documents for document productions in legal proceedings.

In optional step 180, old backup servers 36 may be decommissioned. Once the backup server 36 has uploaded its backup catalog to the central server 32, if that backup server 36 is no longer configured to actively back up clients 42, then that backup server may be decommissioned.

In optional step 190, as the expiration dates associated with each backup record in the central backup catalog 58 pass, the associated backup record may be marked as expired. Once all backup records associated with a particular backup tape are expired (if tapes are used for back-up), then that tape may be destroyed, re-used, or recycled (generally, retired). A tape management program may be used for the purpose of managing the retirement of backup tapes. In one embodiment, the tape management program is integrated into application 56-1 (and the associated process 56-2). In another embodiment, tape management program may execute separately but may communicate with process 56-2 and receive expiration (and other) data from it.

Figure 4:
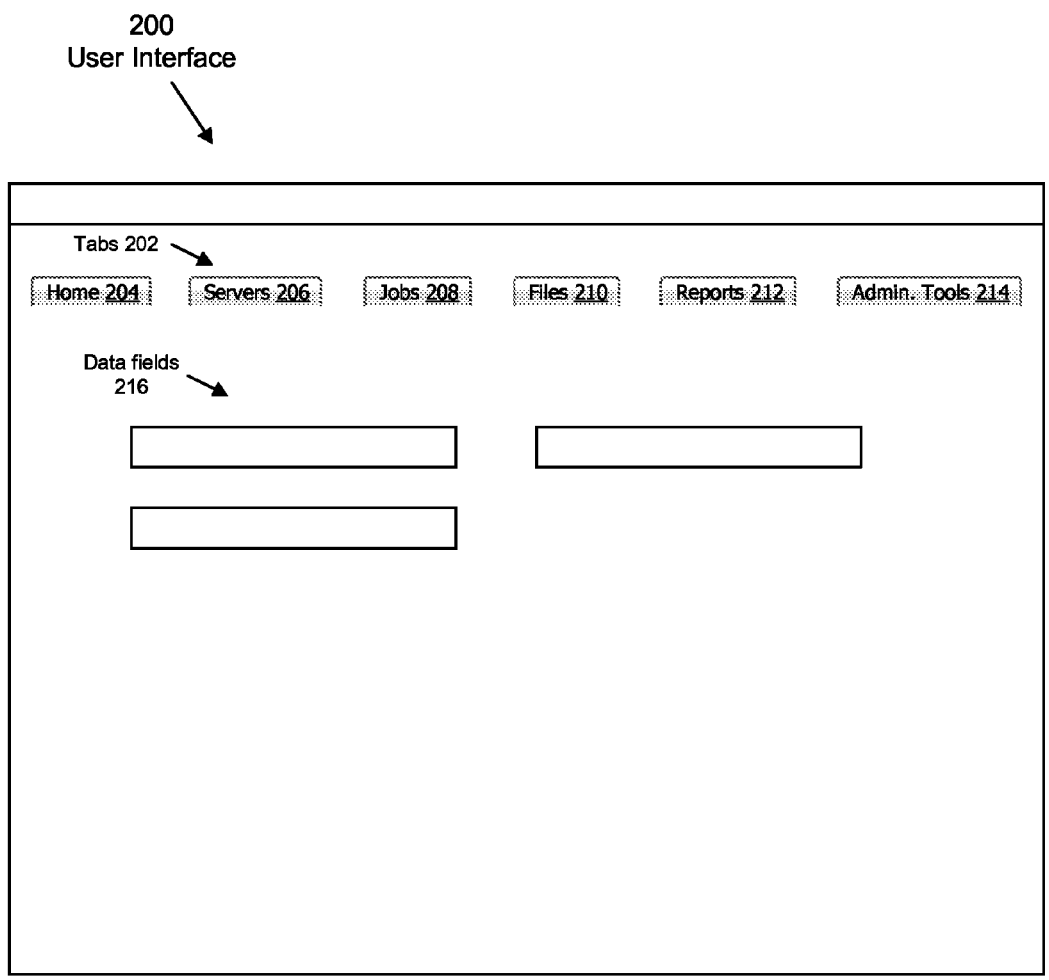
FIG. 4 illustrates a user interface for use in practicing various embodiments.

In one embodiment, application 56-1 includes a web server configured to serve and dynamically create web pages of a user interface (UI) 200 depicted in FIG. 4. UI 200 may include a set of tabs 202 that allow the user to switch between various tasks. Tabs 202 may include, for example, a "home" tab 204, a "servers" tab 206, a "jobs" tab 208, a "files" tab 210, a "reports" tab 212, and an "administrative tools" tab 214. For example, when the user clicks on the "servers" tab 206, the user is given the option to further select whether to register a new backup server 36, or whether to browse through a list of previously registered backup servers 36. In order to register a backup server 36, as previously described in step 110 (see FIG. 3), the user enters data into fields 216 provided on a web page of UI 200. If the user is browsing a list (not depicted) of registered backup servers 36, he or she may click on any backup server 36 listed and see details (not depicted) associated with that particular backup server 36. These details may include, for example, the user-provided information about the backup server 36 as well as data regarding the status of that backup server 36, such as, for example, as list of all backup jobs stored on that server, the scrubbing status of each job, and other metadata. The details may also include a log of activities performed on that backup server 36. The user may also click on a "read" button (not depicted), which sends a command to the central server 32 indicating that the backup catalog of the selected backup server 36 should be read onto the central server. If a user clicks on the "files" tab 210, then the user is able to fill out various data fields 216 to search for particular files. Matching files and associated metadata may be displayed on the UI 200 once a search is performed.

While various embodiments of the invention have been particularly shown and described, it will be understood by those skilled in the art that various changes in form and details may be made therein without departing from the spirit and scope of the invention as defined by the appended claims.

For example, while the various components of central server 32 have been shown and described as residing at a single location, this is by way of example only. In other arrangements, the various components of the central server 32 may be distributed across a distributed network.

Furthermore, it should be understood that all combinations of described features and described embodiments are hereby taught in all possible combinations, unless explicitly excluded.

What is claimed is:

1. A method of centralizing storage of backup records, the method comprising:
    at a first web-browser, receiving a first user request to send a first backup catalog stored on a first backup server to a central server, the first backup catalog storing a plurality of backup records, each backup record including metadata about a different backup job performed by the first backup server to backup user data onto removable media, wherein the metadata within each backup record of the first backup catalog about the respective backup job performed by the first backup server includes: a list of files backed up in that backup job, an identification of a client machine from which the files backed up in that backup job originated, a serial number identifying a particular removable media unit of the removable media where the files were stored in that backup job, a date that that backup job was performed, and an expiration date associated with the files stored in that backup job;
    at the first web-browser, in response to receiving the first user request, sending a first web-based command to the central server over a network;
    at the central server, receiving the first web-based command, and, in response, sending, to the first web-browser, a first web-browser-compatible applet configured to upload the first backup catalog from the first backup server to the central server over the network;
    at a second web-browser, receiving a second user request to send a second backup catalog stored on a second backup server to the central server, the second backup server being distinct from the first backup server, the second backup catalog storing a plurality of backup records, each backup record including metadata about a different backup job performed by the second backup server to backup user data onto removable media;
    at the second web-browser, in response to receiving the second user request, sending a second web-based command to the central server over the network;
    at the central server, receiving the second web-based command, and, in response, sending, to the second web-browser, a second web-browser-compatible applet configured to upload the second backup catalog from the second backup server to the central server over the network;
    at the central server, receiving, over the network, the first backup catalog from the first web-browser and the second backup catalog from the second web-browser;
    at the central server, extracting all backup records from the received first backup catalog and the received second backup catalog; and placing each extracted backup record into a central backup catalog on the central server.

2. The method of claim 1 wherein receiving the first user request includes:
    a user loading the first web browser into memory on the first backup server, the first web browser executing on the first backup server;
    at the first web browser, receiving a command from the user to load a configuration web page from the central server over the network;
    at the first web browser, displaying the configuration web page to the user on a display of the first backup server;
    at the first web browser, receiving a user input signal indicating that the user has clicked on an upload link of the configuration page via a user interface device of the first backup server.

3. The method of claim 2 wherein:
    the method further comprises, at the first web browser, operating the first web-browser-compatible applet within a Java virtual machine on the first backup server; and
    the first web-browser-compatible applet is configured to, when operated in the Java virtual machine on the first backup server:
        cause the first backup server to read data from the first backup catalog of the first backup server;
        cause the read data to be stored in a memory queue of custom data structures on the first backup server; and
        in response to receiving a signal from the first web browser indicating that the central server is ready to receive data, cause data to be dequeued from the memory queue and sent to the first web browser to send to the central server.

4. The method of claim 1 wherein receiving the first user request includes:
    a user loading the first web browser into memory on a computer connected to the network, the computer being distinct from the central server and from the first backup server, the computer being in communication with the first backup server over the network, a disk of the first backup server that stores the first backup catalog being remotely mounted onto the computer, the first web browser executing on the computer;
    at the first web browser, receiving a command from the user to load a configuration web page from the central server over the network;
    at the first web browser, displaying the configuration web page to the user on a display of the computer;
    at the first web browser, receiving a user input signal indicating that the user has clicked on an upload link of the configuration page via a user interface device of the computer.

5. The method of claim 1 wherein:
    the method further comprises, at the first web browser, operating the first web-browser-compatible applet within a Java virtual machine on the computer; and
    the first web-browser-compatible applet is configured to, when operated in the Java virtual machine on the computer:
        cause the computer to read data from the first backup catalog of the first backup server via the remotely mounted disk;
        cause the read data to be stored in a memory queue of custom data structures on the computer; and
        in response to receiving a signal from the first web browser indicating that the central server is ready to receive data, cause data to be dequeued from the memory queue and sent to the first web browser to send to the central server.

6. The method of claim 1 wherein the method further includes, at the central server, receiving a registration message from a user, the registration message including a name of the first backup server, an operating system type of the first backup server, and a backup software type of the first backup server.

7. The method of claim 1 wherein:
extracting all backup records from the received first backup catalog and the received second backup catalog includes:
- extracting the backup records from the first backup catalog into a staging table on the central server;
- converting each extracted backup record from the first backup catalog into a standardized format used by the central server;
- extracting the backup records from the second backup catalog into the staging table on the central server; and
- converting each extracted backup record from the second backup catalog into a standardized format used by the central server; and placing each extracted backup record into the central backup catalog on the central server includes:
- once all backup records from the first backup catalog have been extracted into the staging table and converted into the standardized format, inserting the contents of the staging table into the central backup catalog and clearing the staging table; and
- once all backup records from the second backup catalog have been extracted into the staging table and converted into the standardized format, inserting the contents of the staging table into the central backup catalog and clearing the staging table.

8. A system for centralizing storage of backup records, the system comprising:
a network;
a central server connected to the network; and
a plurality of backup servers, each backup server storing a local backup catalog having a plurality of backup records, each backup record including metadata about a different backup job performed by that backup server to backup user data onto removable media, wherein the metadata within each backup record of the local backup catalog of each backup server about the respective backup job performed by that backup server includes: a list of files backed up in that backup job, an identification of a client machine from which the files backed up in that backup job originated, a serial number identifying a particular removable media unit of the removable media where the files were stored in that backup job, date that that backup job was performed, and an expiration date associated with the files stored in that backup job;
wherein each backup server includes a processor and a memory, and is configured to:
receive a user request to send the local backup catalog stored on that backup server to a central server; and
in response to receiving the user request, send a web-based command to the central server over the network; and
wherein the central server is configured to:
receive, over the network, the web-based command from a backup server of the plurality of backup servers, and, in response, send, over the network, to that backup server, a first web-browser-compatible applet configured to upload the local backup catalog from that backup server to the central server over the network;
receive, over the network, the local backup catalog from that backup server;
extract all backup records from the received local backup catalog from that backup server; and place each extracted backup record into a central backup catalog on the central server.

9. The system of claim 8 wherein each backup server, when receiving the user request, is configured to:
receive instructions from a user to load a web browser into memory;
load the web browser into memory and run the web browser;
at the web browser, receive a command from the user to load a configuration web page from the central server over the network;
at the web browser, display the configuration web page to the user on a display of the backup server;
at the web browser, receive a user input signal indicating that the user has clicked on an upload link of the configuration page via a user interface device of that backup server.

10. The system of claim 9 wherein:
each backup server is further configured to operate the web-browser-compatible applet within a Java virtual machine on that backup server; and
the web-browser-compatible applet is configured to, when operated in the Java virtual machine on a backup server of the plurality of backup servers:
- cause that backup server to read data from its local backup catalog;
- cause the read data to be stored in a memory queue of custom data structures on that backup server; and
- in response to receiving a signal from the web browser indicating that the central server is ready to receive data, cause data to be dequeued from the memory queue and sent to the web browser to send to the central server.

11. The system of claim 8 wherein the central server is further configured to receive a registration message from a user, the registration message including a name of a first backup server, an operating system type of the first backup server, and a backup software type of the first backup server.

12. The system of claim 8 wherein the central server:
when extracting all backup records from the received local backup catalog from each backup server, is configured to:
- extract each backup record from the received local backup catalog into a staging table on the central server; and
- convert each extracted backup record from the received local backup catalog into a standardized format used by the central server; and
when placing each extracted backup record into the central backup catalog on the central server, is configured to:
- once all backup records from the each received local backup catalog have been extracted into the staging table and converted into the standardized format, insert the contents of the staging table into the central backup catalog and clear the staging table.

13. A system for centralizing storage of backup records, the system comprising:
a network;
a central server connected to the network;
a plurality of backup servers, each backup server storing a local backup catalog having a plurality of backup records, each backup record including metadata about a different backup job performed by that backup server to backup user data onto removable media, wherein the metadata within each backup record of the local backup catalog of each backup server about the respective backup job performed by that backup server includes: a list of files backed up in that backup job, an identification of a client machine from which the files backed up in that backup job originated, a serial number identifying a particular removable media unit of the removable media where the files were stored in that backup job, a date that that backup job was performed, and an expiration date associated with the files stored in that backup job; and a computer, the computer being distinct from the central server and from each backup server of the plurality of backup servers, a disk of one of the backup servers of the plurality of backup servers that stores the local backup catalog of the one backup server being remotely mounted onto the computer;

wherein the computer includes a processor and a memory, and is configured to:

receive a user request to send the local backup catalog stored on the one backup server to a central server; and in response to receiving the user request, send a web-based command to the central server over the network; and wherein the central server is configured to:

receive, over the network, the web-based command from the computer, and, in response, send, over the network, to the computer, a web-browser-compatible applet configured to upload the local backup catalog from the one backup server to the central server over the network;

receive, over the network, the local backup catalog of the one backup server from the computer;

extract all backup records from the received local backup catalog of the one backup server; and place each extracted backup record into a central backup catalog on the central server.

14. The system of claim 13 wherein the computer, when receiving the user request, is configured to:
receive instructions from a user to load a web browser into memory;
load the web browser into memory and run the web browser;
at the web browser, receive a command from the user to load a configuration web page from the central server over the network;
at the web browser, display the configuration web page to the user on a display of the computer;
at the web browser, receive a user input signal indicating that the user has clicked on an upload link of the configuration page via a user interface device of the computer.

15. The system of claim 11 wherein:
the computer is further configured to operate the web-browser-compatible applet within a Java virtual machine on the computer; and
the web-browser-compatible applet is configured to, when operated in the Java virtual machine on the computer:
cause the computer to read data from the local backup catalog of the one backup server via the remotely mounted disk;
cause the read data to be stored in a memory queue of custom data structures on the computer; and
in response to receiving a signal from the web browser indicating that the central server is ready to receive data, cause data to be dequeued from the memory queue and sent to the web browser to send to the central server.

16. The system of claim 13 wherein the central server is further configured to receive a registration message from a user, the registration message including a name of the one backup server, an operating system type of the one backup server, and a backup software type of the one backup server.

17. The system of claim 13 wherein the central server:
when extracting all backup records from the received local backup catalog of the one backup server, is configured to:
extract each backup record from the received local backup catalog into a staging table on the central server; and
convert each extracted backup record from the received local backup catalog into a standardized format used by the central server; and
when placing each extracted backup record into the central backup catalog on the central server, is configured to:
once all backup records from the received local backup catalog have been extracted into the staging table and converted into the standardized format, insert the contents of the staging table into the central backup catalog and clear the staging table.

* * * * *

UNITED STATES PATENT AND TRADEMARK OFFICE
CERTIFICATE OF CORRECTION

Page 1 of 1

PATENT NO.          : 8,862,547 B2
APPLICATION NO.     : 12/134010
DATED               : October 14, 2014
INVENTOR(S)         : Eric Scott Kramer et al.

It is certified that error appears in the above-identified patent and that said Letters Patent is hereby corrected as shown below:

In the claims

Claim 5, Column 6, Line 49, "claim 1" should read --claim 4--.

Claim 15, Column 10, Line 5, "claim 11" should read --claim 14--.

Signed and Sealed this
Third Day of February, 2015

Michelle K. Lee
*Deputy Director of the United States Patent and Trademark Office*